UNITED STATES PATENT OFFICE.

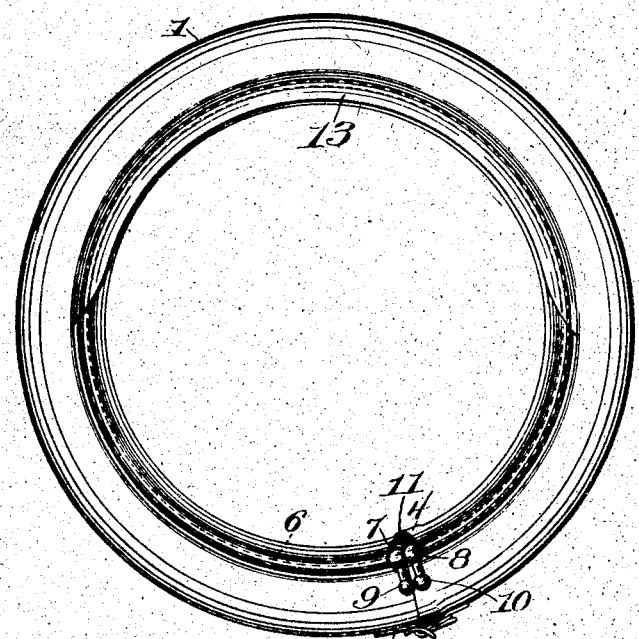
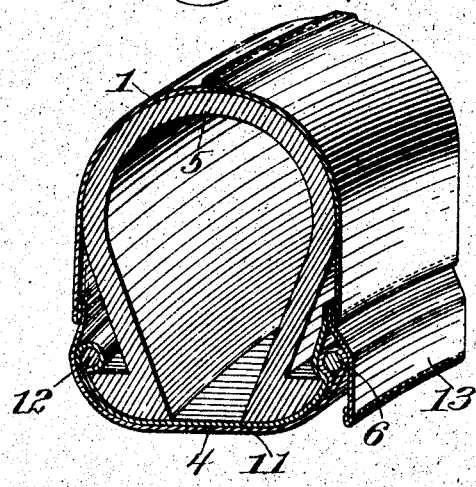
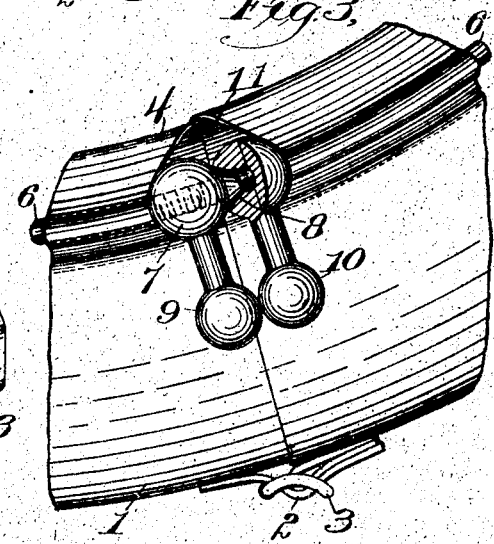

HOWARD R. TEEL, OF MEDFORD, MASSACHUSETTS.

TIRE-CASE.

No. 815,319. Specification of Letters Patent. Patented March 13, 1906.

Continuation of application Serial No. 286,138, filed November 6, 1905. This application filed January 6, 1906. Serial No. 294,859.

*To all whom it may concern:*

Be it known that I, HOWARD R. TEEL, a citizen of the United States, residing in Medford, in the county of Middlesex and State of Massachusetts, have invented an Improvement in Tire-Cases, of which the following description, in connection with the accompanying drawings, is a specification, like numerals on the drawings representing like parts.

The present invention relates to a tire-case, and is embodied in a case of the kind used for the protection of extra tires which are usually carried on touring-automobiles to be used in case of emergency. It is necessary to make these cases as nearly as possible dirt and water proof, it being especially desirable to protect the rim or open portion of the tire-shoe contained in the case.

The objects of the present invention are to obtain a case which will completely inclose the tire and protect the same from dirt and moisture and also to provide a case which can be quickly and easily applied to and removed from the tire.

The invention further relates to certain structural features, which will be more fully hereinafter described.

The case embodying the invention is provided with a main portion which fits over the tread and sides of the tire and a supplemental portion which is in the nature of a flap or extended portion lying along the edge of the main portion, said extended portion being preferably of sufficient width to reach across the rim portion of the tire to the opposite side thereof. For convenience in applying the case the main portion is open at one point and provided adjacent to the opening with a suitable fastening device—such, for example, as a strap and buckle—while the extended portion is held in place adjacent to the rim portion or inner periphery by means of a retaining device which holds said extended portion in snug contact with the rim portion of the tire, which in most cases is open and needs protection from dust and moisture. For the better protection of the tire it may be desirable to duplicate the flaps and retaining devices, and in the construction chosen as an illustration of the invention the main portion of the case is shown as provided with a flap and retaining device along each edge, the said flaps overlapping along the rim portion of the tire.

Figure 1 is a side elevation of a tire-case embodying the invention shown as applied to a tire and closed. Fig. 2 is an enlarged section through the tire and case, part of the case being shown in perspective; and Fig. 3 is a side elevation of a part of the case with parts broken out, this figure being drawn to the same scale as Fig. 2.

The main portion 1 of the casing is of sufficient length to extend completely around a tire and preferably to overlap to some extent at the ends, this main portion being shaped to fit over the tread and sides of the tire. The ends of said portion 1 are provided with suitable fastening devices—such, for example, as the strap 2 and buckle 3—so that the said main portion 1 will be held snugly against the tire when the casing is in position. In order to complete the casing so as wholly to inclose the tire, the main portion 1 is provided at the edge with an extension or flap 4, the width of which in the construction shown is slightly greater than the width of the rim portion of the tire 5. To close the casing, therefore, the said flap is drawn across the rim portion of the tire to the other side of the tire and over the opposite side of the main portion, as best shown in Fig. 2, thereby completely inclosing the tire. In order to hold the said flap in position, it is provided at its outer edge with a suitable retaining device, herein shown as the hoop 6, which is somewhat elastic or otherwise capable of distortion, so as to admit of passing it through from one side of the tire to the other, the said hoop then being extended to a diameter greater than the inner diameter of the tire, so that it constitutes a retaining device to hold the flap snugly in position. It is practicable to utilize for this purpose a hoop of wire contained in a pocket formed by turning over the edge of the flap, and in order to hold the said hoop firmly in its extended shape the two ends may be joined together by any suitable means. In the construction shown (see Fig. 3) the ends of the hoop 6 are provided, respectively, with a ball 7 and a socket 8, the tension of the hoop being sufficient to hold the ball and socket together. The members 7 and 8 may be provided with finger-pieces or handles 9 and 10 to facilitate the handling of the hoop in putting on or taking off the cover. These finger-pieces may be screw-threaded on the ends of the hoop, so that when turned to the position shown they tend to spread the hoop and increase the tension which holds the ends together. In order to apply the casing to the tire, the two ends of the hoop are pulled past each other to a sufficient extent to reduce the diameter of the hoop so that it can be slipped with the flap across the tire, after which it is distended and the ends brought together, so as to hold it in position. In order to protect the tire more fully, the opposite edge of the main portion 1 of the case may also be provided, as shown, with a flap 11, which is substantially like the flap 4, and provided with the retaining-hoop 12, the two flaps overlapping and being retained at opposite sides of the tire, as best shown in Fig. 2.

It will be seen from the foregoing description that when the case is applied to the tread portion of an inner-tube tire—this being the kind of tire most commonly in use—the opening along the rim portion of the tire is fully protected from dirt and moisture, which are thus prevented from collecting inside the tire. In order to afford further protection and to keep out any moisture which might work in under the flap—for example, in a heavy rain or in washing the car—the case is shown as provided with a deflecting member or watershed 13, consisting of a strip of material sewed or otherwise fastened to the side of the case around a portion thereof at a point adjacent to the flap, so that it projects over the said flap and covers the part where the said flap adjoins the main portion of the case. This water-shed may of course be extended completely around the case; but it usually will afford adequate protection if extended, as shown, part way around the case, the case being carried with the water-shed uppermost.

This case is a continuation of my prior application filed November 6, 1905, Serial No. 286,138.

I claim—

1. A tire-case, having a main portion to fit over the tread and sides of the tire, a supplemental portion at one edge of said main portion and of sufficient width to extend across to the opposite side of the case to cover the rim portion of the tire, and a retaining device at the opposite edge only of said supplemental portion adapted to engage the other side of the main portion at the side of the case to hold the case in position about a tire, substantially as described.

2. A tire-case, having a main portion to fit over the tread and sides of the tire, a flap extending beyond the edge of said main portion to project across and cover the rim portion of the tire, and a retaining-hoop for the outer edge of said flap.

3. A tire-case, having a main portion to fit over the tread and sides of the tire, a flap along each edge of said main portion, and a retaining-hoop connected with the outer edge of each flap, substantially as described.

4. A tire-case, having overlapping portions adapted to extend across the tire from one side to the other, retaining-hoops connected with the edges of said overlapping portions, and means for connecting together the opposite ends of each hoop, substantially as described.

5. A tire-case, the main portion of which is adapted to be fitted over the body of the tire, said case being extended at the edge to form a flap, a pocket formed along the outer edge of said flap, a hoop contained in said pocket, and means for maintaining said hoop distended to fasten the flap in position.

6. A tire-case, having a main portion adapted to fit over the tread and sides of the tire, a supplemental portion to cover the rim portion of the tire, a retaining-hoop connected with the outer edge of said supplemental portion, and means for uniting the ends of said hoop to keep the hoop distended, substantially as described.

7. A tire-case, having a main portion to fit over the tread and sides of the tire, a flap extending beyond the edge of said main portion to project across and cover the rim portion of the tire, a retaining-hoop secured to the outer edge of said flap, and a ball and socket connected with the ends of said hoop, respectively.

8. A tire-case, having a main portion to fit over the tread and sides of the tire, a flap extending beyond the edge of said main portion to project across and cover the rim portion of the tire, a retaining-hoop secured to the outer edge of said flap, a ball and socket screw-threaded on the ends of said hoop, respectively, and finger-pieces connected with said ball and socket.

9. A tire-case, having a main portion to fit over the tread and sides of the tire, a supplemental portion at one edge of the main portion to cover the rim portion of the tire and overlapping the opposite side of the main portion, and a water-shed connected with the main portion in position to cover and protect the overlapping edge of said supplemental portion.

In testimony whereof I have signed my name to this specification in the presence of two subscribing witnesses.

HOWARD R. TEEL.

Witnesses:
HENRY J. LIVERMORE,
MARGARET E. COVENEY.